C. H. PARKER.
CENTRIFUGAL DISCHARGE MECHANISM.
APPLICATION FILED DEC. 28, 1910.
1,020,307.
Patented Mar. 12, 1912.
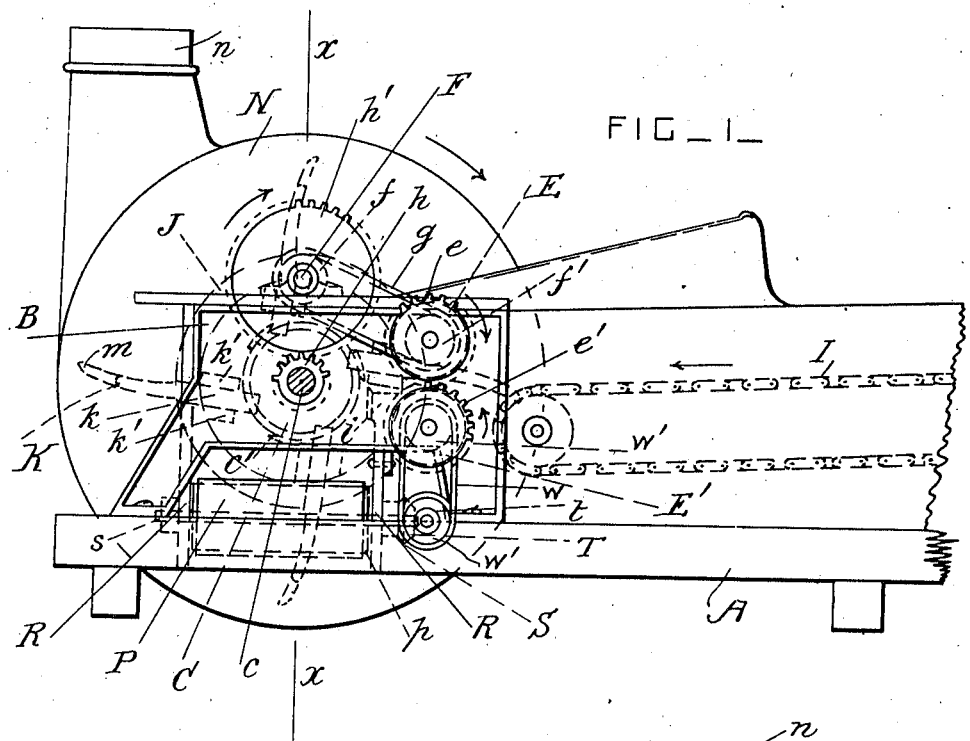
FIG_1_
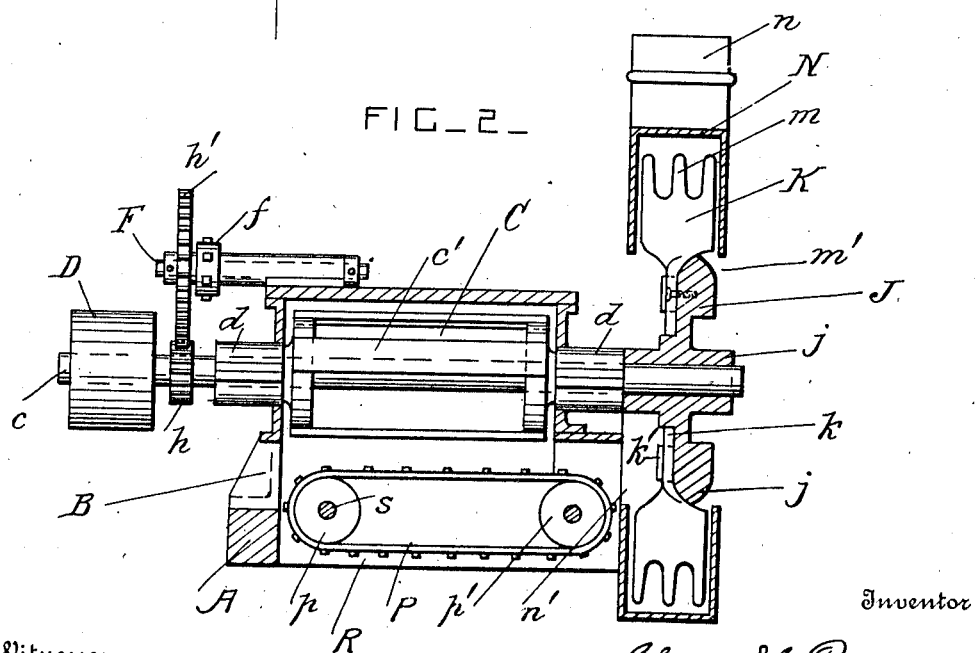
FIG_2_
Witnesses
S. B. Middleton
C. W. Sutton
Inventor
Clark H. Parker,
By Herbert W. Jenner.
Attorney

UNITED STATES PATENT OFFICE.

CLARK H. PARKER, OF BEAVER DAM, WISCONSIN.

CENTRIFUGAL DISCHARGE MECHANISM.

1,020,307.   Specification of Letters Patent.   Patented Mar. 12, 1912.

Application filed December 28, 1910. Serial No. 599,769.

*To all whom it may concern:*

Be it known that I, CLARK H. PARKER, a citizen of the United States, residing at Beaver Dam, in the county of Dodge and State of Wisconsin, have invented certain new and useful Improvements in Centrifugal Discharge Mechanism; and I do hereby declare the following to be a full, clear, and exact description of the invention, such as will enable others skilled in the art to which it appertains to make and use the same.

This invention relates to mechanism for discharging ensilage from an ensilage cutter into a silo; and it consists chiefly of a centrifugal discharger operatively connected with the cutting machine as hereinafter fully described and claimed.

In the drawings, Figure 1 is a side view of the cutting machine and the discharger. Fig. 2 is a cross-section taken on the line *x—x* in Fig. 1.

A is a supporting base of any approved construction.

B is the frame of the cutting machine, and C is a cutting cylinder provided with a driving shaft *c* and cutting blades *c'*. The driving shaft *c* is journaled in bearings *d* on the frame B, and D is a driving pulley secured on one end portion of the shaft.

The working parts of the cutting machine are of any approved construction, and may be varied considerably in carrying out this invention, as the cutting machine herein described is only one form of cutting machine which can be used.

E E' are the two feed rollers journaled in the frame B. These rollers are connected by toothed wheels *e e'*, and are driven from a countershaft F by pulleys *f* and *f'* and a belt or drive-chain *g*. The countershaft F is driven from the driving shaft *c*, but at a reduced speed, by means of the toothed wheels *h* and *h'*.

I is an endless carrier of any approved construction which conveys the ensilage to the feed rollers, and *i* is the support the ensilage rests on while being cut.

J is a disk fly-wheel having a heavy rim at its periphery, and provided with a hub *j* which is secured on the other end portion of the shaft *c* from the driving pulley.

K are discharge blades arranged crosswise of the fly-wheel, and provided with shanks *k* which are secured between lugs *k'* cast in pairs on one side of the fly-wheel. The blades are preferably curved forwardly to a slight extent in the direction of their motion, and they are provided with projecting tines or fingers *m*, but these tines or fingers may be omitted if desired, and plain flat plates may be used for discharging the cut material.

N is the discharger casing provided with an outlet pipe *n* at one portion of its periphery. This casing is secured to the base A, and it is provided with an inlet opening *n'* on the side next to the cutting machine. An opening *m'* is provided on the other side of the casing N of about the same diameter as the fly-wheel, so that air can enter freely around the rim of the fly-wheel, which has a beveled portion *j* adjacent to the opening, and so that the cut material cannot become packed in this portion of the casing. The shanks of the discharger blades are secured to the front side of the fly-wheel disk next to the inlet opening for material which is at the front side of the casing. The rear side of the fly-wheel disk is arranged in substantially the same plane as the inner side of the casing around the air opening *m'*, which is at the rear part of the casing. The blades are not arranged radial of the axis of the driving shaft, but are eccentric of said axis as this enables them to discharge the material with better effect.

P is a conveyer arranged under the cutting cylinder. This conveyer is provided with an endless apron which works over rollers *p* and *p'* which are journaled between two vertical side plates R, which form a portion of the frame B of the cutting machine, or which are otherwise secured to the frame. The roller *p* is provided with a driving shaft *s*, and S is a beveled toothed wheel secured on one end portion of the shaft *s*. The wheel S gears into a similar wheel T which is secured on a shaft *t* supported by the base A. The shaft *t* is revolved from the shaft of the lower feed roller by means of a belt or drive-chain *w* and wheels *w'*.

The curved arrows on the drawings show the directions of the motions of the various revolving parts.

The ensilage which is fed into the cutting machine is cut up by its cylinder, and the cut material falls on the conveyer P which discharges it through the opening *n'* into the discharger casing. The cut material is caught by the blades of the discharger, and is flung by centrifugal force up the outlet pipe.

The frame of the cutting machine is open at the ends of the conveyer and underneath it, so that air can enter freely, and so that no places are formed where portions of the cut material can become packed.

What I claim is:

In a centrifugal discharger, the combination, with a driving shaft, and a disk fly-wheel secured thereon and having a beveled edge at the rear part of its periphery; of a discharger casing inclosing the fly-wheel and having an air-inlet opening in its rear side of substantially the same diameter as the fly-wheel, the rear side of the fly-wheel being arranged substantially in the same plane as the inner and adjacent side of the casing, and the said casing having also an inlet opening for the material in its front side; and discharger blades working in the said casing and provided with shanks which are secured against the front side of the fly-wheel.

In testimony whereof I have affixed my signature in the presence of two witnesses.

CLARK H. PARKER.

Witnesses:
A. J. SCHULZE,
A. W. SPANGLER.